(12) United States Patent
Stierle et al.

(10) Patent No.: US 7,259,837 B2
(45) Date of Patent: Aug. 21, 2007

(54) DEVICE FOR RELEASABLE FASTENING OF AN ACCESSORY AND ACCESSORY FOR SUCH A DEVICE

(75) Inventors: Joerg Stierle, Waldenbuch (DE); Peter Wolf, Leinfelden-Echterdingen (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 10/492,318

(22) PCT Filed: Jan. 24, 2003

(86) PCT No.: PCT/DE03/00187

§ 371 (c)(1),
(2), (4) Date: Apr. 12, 2004

(87) PCT Pub. No.: WO03/081173

PCT Pub. Date: Oct. 2, 2003

(65) Prior Publication Data

US 2004/0239914 A1 Dec. 2, 2004

(30) Foreign Application Priority Data

Mar. 26, 2002 (DE) ................ 102 13 434

(51) Int. Cl.
*G01C 3/08* (2006.01)
(52) U.S. Cl. .................................... 356/5.01
(58) Field of Classification Search ................ 356/5.01
See application file for complete search history.

(56) References Cited

U.S. PATENT DOCUMENTS

| | | | | |
|---|---|---|---|---|
| 3,918,814 A | * | 11/1975 | Weiser | ............... 356/620 |
| 5,260,554 A | | 11/1993 | Grodevant | |
| 5,477,459 A | * | 12/1995 | Clegg et al. | ............... 701/300 |
| 5,926,260 A | * | 7/1999 | Dunne et al. | ............... 356/5.05 |
| 6,073,352 A | * | 6/2000 | Zykan et al. | ............... 33/265 |
| 6,324,888 B1 | | 12/2001 | Schmidt et al. | |
| 6,522,534 B1 | * | 2/2003 | Wu | ............... 361/686 |
| 2002/0067471 A1 | * | 6/2002 | Bhat | ............... 353/119 |
| 2002/0072387 A1 | * | 6/2002 | Kao | ............... 455/550 |
| 2004/0051865 A1 | * | 3/2004 | Stierle et al. | ............... 356/141.5 |

FOREIGN PATENT DOCUMENTS

| | | | |
|---|---|---|---|
| DE | 38 12 182 | | 10/1989 |
| DE | 198 04 050 | | 8/1999 |
| DE | 198 09 683 | | 9/1999 |
| DE | 100 02 587 | | 8/2001 |
| DE | 101 49 144.1 | * | 9/2001 |
| DE | 100 16 309 A | | 10/2001 |
| EP | 0 693 744 | | 1/1996 |
| EP | 1 050 793 A | | 11/2000 |
| GB | 2 334 172 | | 8/1999 |
| JP | 58221108 A | | 12/1983 |
| WO | 98 08052 A | | 2/1998 |
| WO | 01 91978 A | | 12/2001 |

* cited by examiner

*Primary Examiner*—Thomas H. Tarcza
*Assistant Examiner*—Luke D. Ratcliffe
(74) *Attorney, Agent, or Firm*—Michael J. Striker

(57) ABSTRACT

The invention is based on a device (10), in particular a laser distance measuring device, having a first mount for releasable fastening of a first accessory (18). It is proposed that the first mount have at least one detent element (22.1), which in the mounted state of the first accessory (18, 20) latches to the first accessory (18, 20). The invention also pertains to a corresponding accessory (18).

33 Claims, 5 Drawing Sheets

DEVICE FOR RELEASABLE FASTENING OF AN ACCESSORY AND ACCESSORY FOR SUCH A DEVICE

BACKGROUND OF THE INVENTION

The invention is based on a known laser distance measuring device.

The known laser distance measuring devices PD20 and PD25 made by HILTI make it possible to fasten a separate sighting telescope, by suspending a metal sheet, screwed to the sighting telescope, from the front of the housing of the laser distance measuring device and fastening it to the housing at the rear with a screw.

SUMMARY OF THE INVENTION

The invention includes the general technological teaching of securing an accessory to a device by means of a detent connection, which advantageously enables simple mounting and removal without using tools.

The device for fastening an accessory can for instance be a laser distance measuring device, but the invention can also be realized with other devices to which accessories can be mounted. Preferably, however, the device is a hand-held electronic device.

The accessory to be fastened can for instance be a sighting lens for a laser distance measuring device and/or a circular or tubular spirit level for determining position, but the invention can also be realized with other accessories. If a tubular and a circular spirit level are advantageously combined in one accessory, then the device can be oriented in multiple directions without having to re-chuck or replace the accessory.

In the preferred embodiment of the invention, the device has two mounts, each for receiving one accessory, and both mounts create a detent connection with the respective accessory. One mount can then for instance receive a sighting telescope, while a spirit level can be fastened to the other mount so that the spatial position of the device can be determined.

Preferably, the two mounts are disposed laterally side by side, but the two mounts can in principle also be disposed in arbitrary other positions.

However, it is advantageous if the two mounts are disposed such that the accessories to be fastened have the same spatial orientation in each mount.

This is especially important for fastening a sighting telescope or a spirit level, since in these cases a predetermined spatial orientation relative to the device must be adhered to.

However, alternatively it is also possible for the two mounts to be spatially oriented differently from one another. This is advantageous for instance in a laser distance measuring device which is capable of measuring vertical and horizontal distances. Then, the sighting telescope can be selectively mounted on the laser distance measuring device with vertical or horizontal orientation. The two mounts, in this variant of the invention, are therefore preferably oriented at right angles to one another.

Advantageously, the device of the invention has a device housing with which the mount for the accessory is integrated, which advantageously makes economical production possible.

The mount can for instance comprise two indentations or undercuts in the device housing, which are disposed at a predetermined spacing from one another. For instance, slit-like indentations can be provided in the device housing, which extend parallel to one another and engage the corresponding detent protrusions on the accessory to be fastened.

The detent connection between the accessory and the device of the invention is preferably made by providing that detent protrusions on the accessory snap into suitably adapted detent recesses on the device. However, it is conversely also possible for the accessory to have detent recesses, which suitably adapted detent protrusions on the device of the invention snap into.

The detent protrusions on the accessory can for instance be disposed on two brackets, which are elastic relative to one another. Then the accessory can simply be slipped onto the mount of the device of the invention, and the two brackets spread resiliently apart until the detent protrusions finally snap into corresponding detent recesses on the device and thereby fix the accessory. The detent protrusions can be shaped in such a way as to create a positive engagement that is designed for high mechanical loads. However, it is also possible to provide additional locking elements, such as a bayonet mount.

In one variant of the invention, both brackets of the accessory are elastic, so that they can spread resiliently apart on being slipped onto the mount of the invention. The two brackets are, however, preferably elastic in only the direction of motion in which they spread resiliently apart, while conversely in other possible directions of motion the two brackets are preferably rigid.

However, preferably one of the two brackets is extensively rigid while the other bracket is elastic. The resilience of one bracket, however, is preferably limited to the direction of motion in which the bracket is intended to spread resiliently apart upon being mounted.

The rigid bracket preferably has a hook, which can catch in a corresponding recess on the mount of the invention. When the accessory is being mounted, accordingly, first the rigid bracket of the accessory is suspended by the hook from the device mount according to the invention. Next, the accessory is then pressed onto the device, causing the elastic bracket to deflect resiliently outward, until finally the detent protrusion provided on the resilient bracket snaps into a corresponding detent recess on the device.

One possible way of defining the resilience of the brackets is to select a length of the brackets accordingly, since the resilience increases with the length.

In the preferred embodiment of the invention, for fastening the accessory to the device, the combination of a detent connection with a hook connection is accordingly employed.

The hook definition here preferably defines a pivot axis about which the accessory can be pivoted relative to the device of the invention upon mounting, until finally the detent connection fixes the accessory in its final position.

Preferably, the hook connection is disposed on the underside, while the detent connection is disposed on the top. In this variant of the invention, the accessory is accordingly made first to catch on the underside and then is pivoted with the top in the direction of the device until the detent connection snaps into place.

However, it is alternatively also possible for the hook connection to be disposed on the top while the detent connection is located on the underside. In this variant, the accessory will first catch on the top and then be pivoted with its underside toward the device until the detent connection snaps into place.

BRIEF DESCRIPTION OF THE DRAWINGS

Further advantages will become apparent from the ensuing description of the drawings. In the drawings, one exemplary embodiment of the invention is shown. The drawing, description and claims include numerous characteristics in combination. One skilled in the art will expediently consider the characteristics individually as well and put them together to make useful further combinations.

Shown are.

DETAILED DESCRIPTION OF THE PREFERRED EMBODIMENTS

Figure 1:
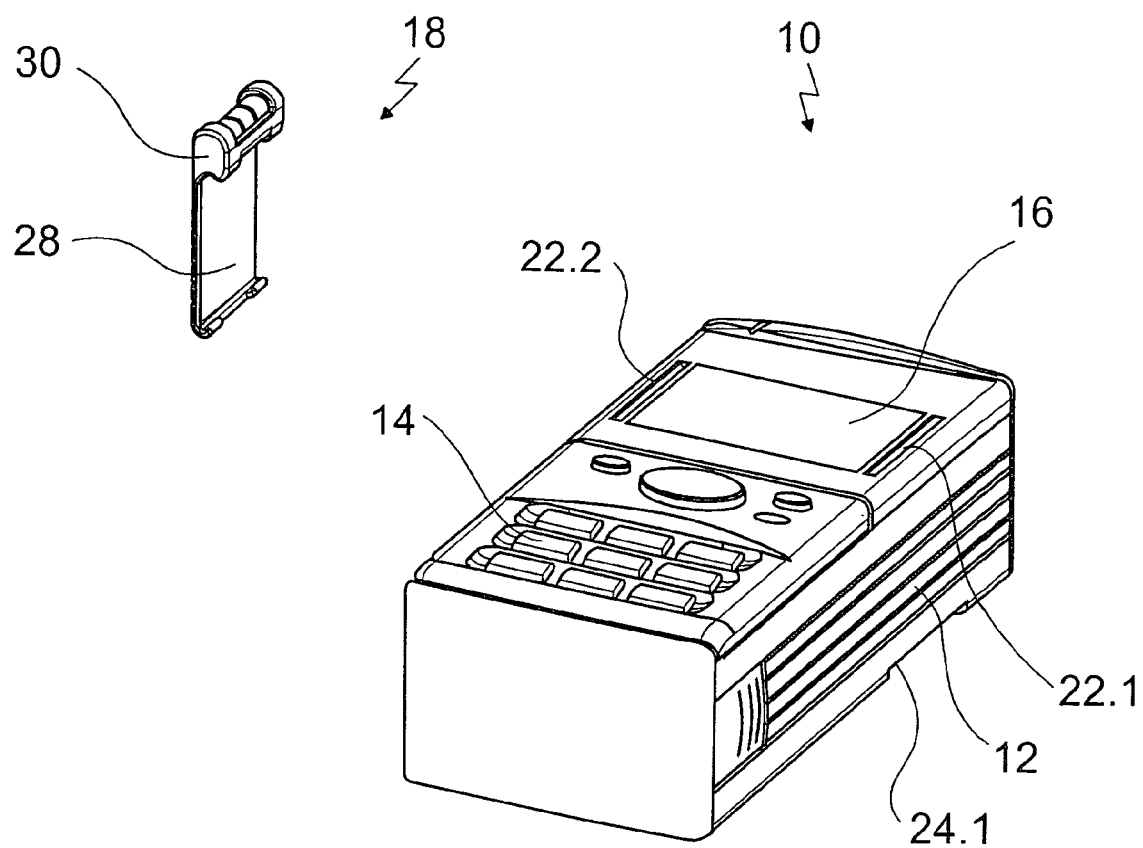
FIG. 1, a perspective view of a laser distance measuring device and of a tubular spirit level that can be mounted as an accessory.
Figure 2:
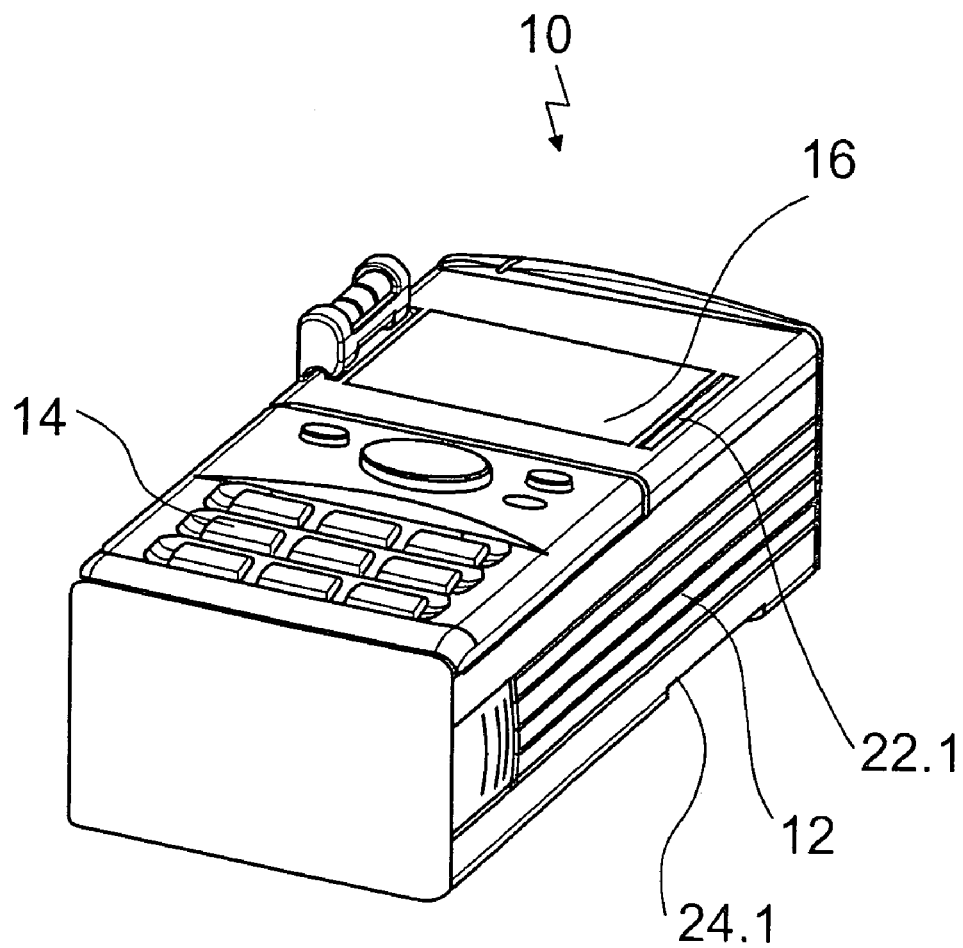
FIG. 2, the laser distance measuring device of FIG. 1 with the tubular spirit level in the mounted state.

The perspective view in FIGS. 1 and 2 shows a laser distance measuring device 10, which is constructed largely in conventional fashion, so that to supplement this description, reference may be made to the relevant professional knowledge.

The laser distance measuring device 10 is accommodated in a substantially rectangular plastic housing 12; a keypad 14 and a display 16 are disposed on the top of the housing 12, making simple operation of the laser distance measuring device 10 possible.

Figure 3:
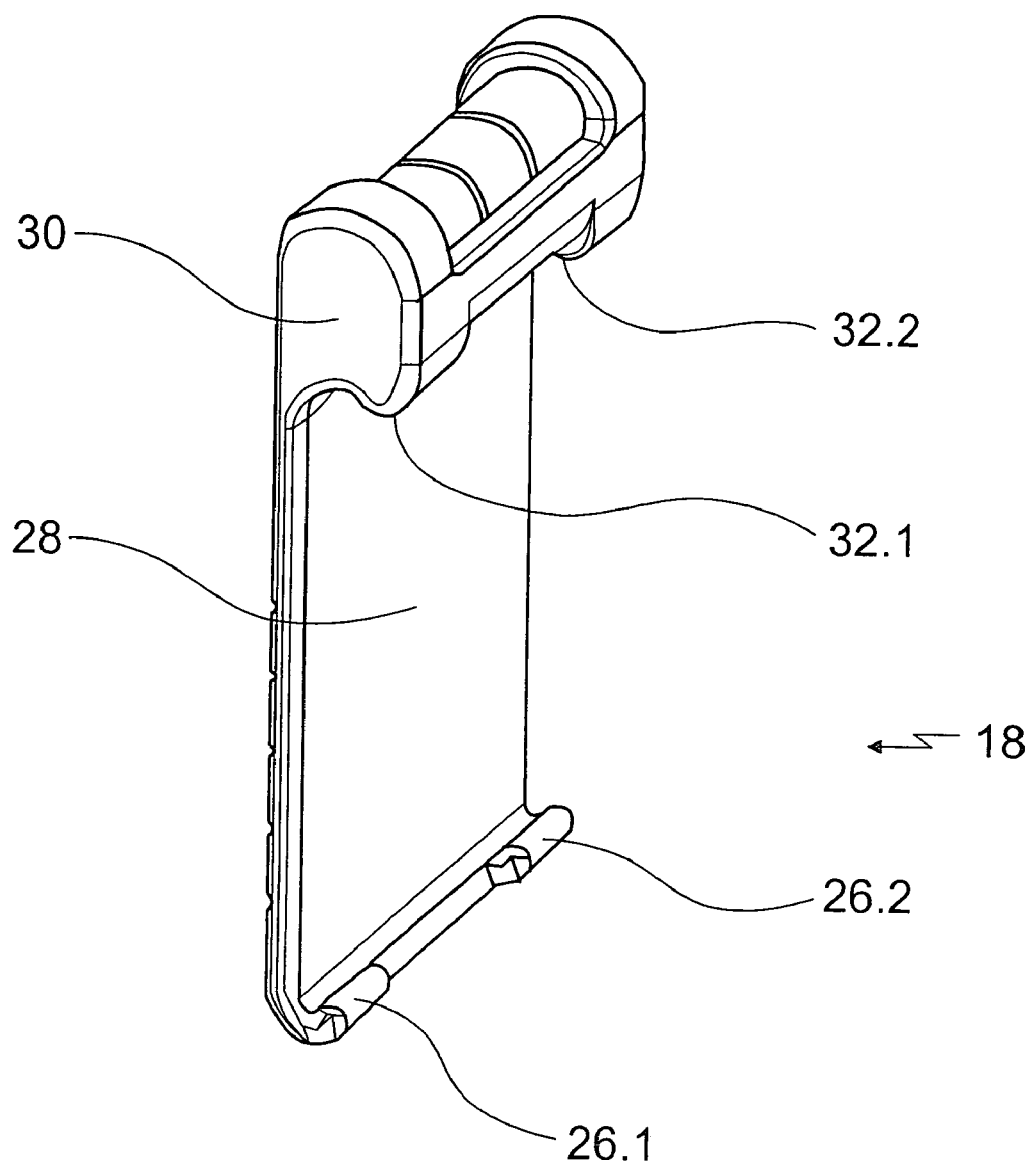
FIG. 3, a more-detailed view of the tubular spirit level of FIGS. 1 and 2.

The laser distance measuring device 10 furthermore has two mounts, on which a tubular spirit level 18, for instance, as shown in more detail in FIG. 3 can be secured as an accessory. In addition, a sighting telescope 20, as shown in more detail in FIG. 4, can also be fastened to one of the two mounts.

The two mounts are each disposed laterally beside the display 16 and each have a respective slitlike indentation 22.1, 22.2 on the top of the housing 12; the indentations 22.1, 22.2 extend parallel to the long edge of the housing 12. On the underside of the housing 12, below the slitlike indentations 22.1, 22.2, is a respective further slitlike indentation 24.1, 24.2, which is oriented parallel to the upper indentation 22.1, 22.2. The two mounts for accessories thus each comprise the upper indentation 22.1, 22.2 and the lower indentation 24.1, 24.2, respectively.

For being fastened to these mounts, the tubular spirit level 18 has two hooks 26.1, 26.2 on its underside, which in the mounted state of the tubular spirit level 18 are suspended in the lower indentation 24.2.

The tubular spirit level 18 further has a connecting wall 28, which in the mounted state of the tubular spirit level 18 has a spacing of approximately 0.5 mm laterally from the side wall of the housing 12 of the laser distance measuring device 10, so that it can sag upon being unlatched.

The connecting wall 28 connects the two hooks 26.1, 26.2, disposed on the underside, to a measuring body 30 disposed on the top; it is in this device that the actual position measurement is made in the conventional way by means of a spirit level.

The measuring body 30 protrudes inward from the connecting wall 28 and on its underside has two detent elements 32.1, 32.2, which in the mounted state of the tubular spirit level 18 snap into the slitlike indentations 22.1, 22.2, respectively, on the top of the laser distance measuring device 10.

For mounting the tubular spirit level 18 on the laser distance measuring device 10, first the two hooks 26.1, 26.2 of the tubular spirit level 18 are suspended into the slitlike indentation 24.1 or 24.2 on the underside of the housing 12 of the laser distance measuring device 10. Next, the tubular spirit level 18 is pivoted in the direction of the laser distance measuring device 10 until the detent elements 32.1, 32.2 rest on the outside of the housing 12 of the laser distance measuring device 10; the hooks 26.1, 26.2 suspended in the indentation 24.1 or 24.2 define a pivot axis. The tubular spirit level 18 is then pressed farther inward by the user with lateral pressure on the measuring body 30, until the detent elements 32.1, 32.2 of the tubular spirit level 18 finally snap into the slitlike indentation 22.1 or 22.2 on the top of the housing 12 of the laser distance measuring device 10. The mounting of the tubular spirit level 18 is facilitated by the provision that the measuring body 30, with the detent elements 32.1, 32.2 provided on it can spread slightly apart resiliently relative to the connecting wall 28.

For removal of the tubular spirit level 18, the user pulls the measuring body 30 outward away from the laser distance measuring device 10 until the detent elements 32.1, 32.2 come unlatched from the slitlike indentation 22.2. Next, the user moves the tubular spirit level 18 downward relative to the laser distance measuring device 10, causing the hooks 26.1, 26.2 to be released from the lower indentation 24.2.

Figure 4:
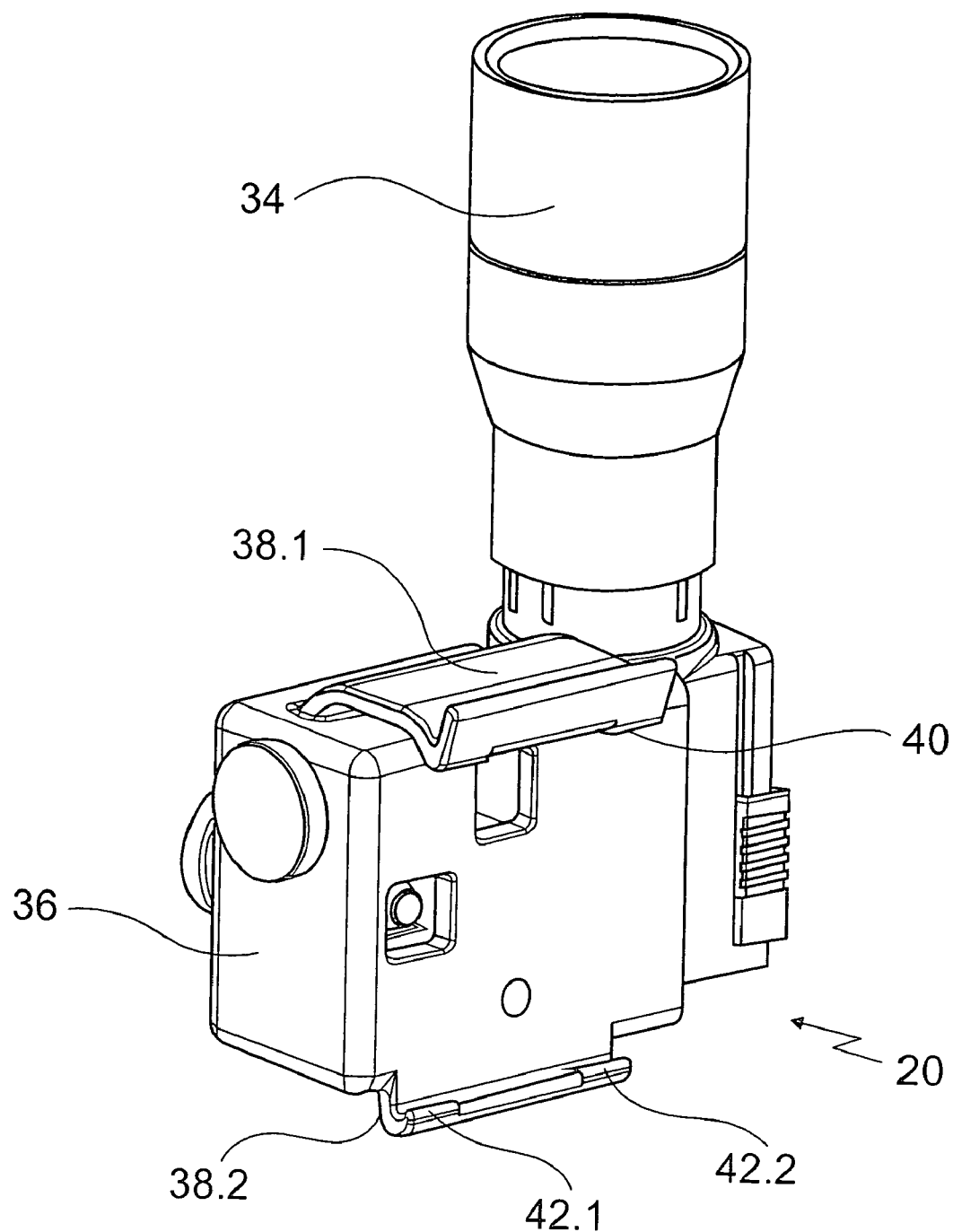
FIG. 4, a perspective view of a sighting telescope which can be mounted on the laser distance measuring device of FIG. 1.
Figure 5:
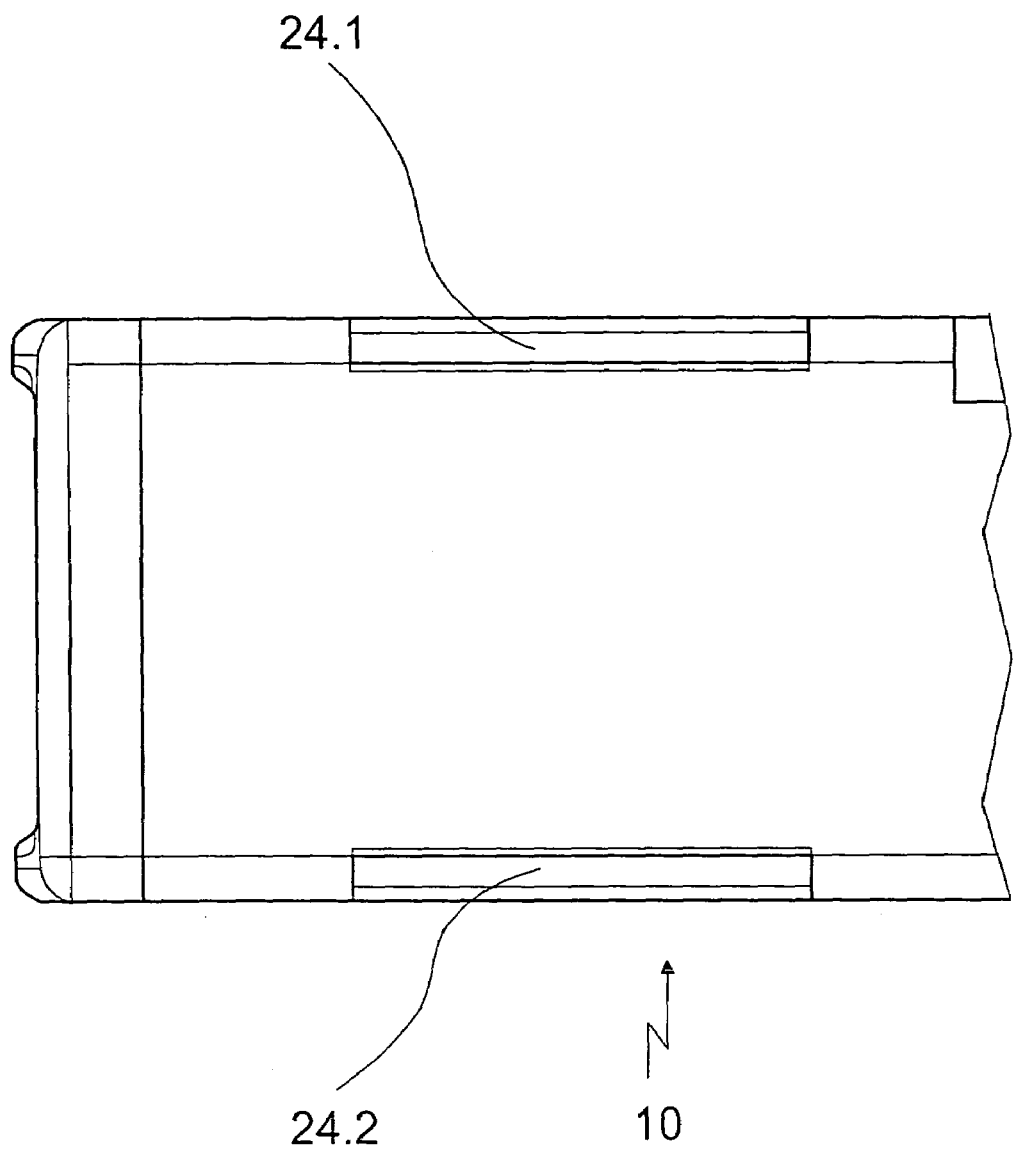
FIG. 5, a view of the laser distance measuring device of FIGS. 1 and 2 from below.

The sighting telescope 20 shown in FIG. 4 has, in addition to an optical element 34, a plastic housing 36.

The fastening of the sighting telescope 20 to the laser distance measuring device 10 is effected essentially in the same way as the fastening, described above, of the tubular spirit level 18.

To that end, the sighting telescope 20 has two brackets 38.1, 38.2, which protrude laterally inward from the housing 36 of the sighting telescope 20.

The upper bracket 38.1 here is integrally formed onto the top of the housing 36 and thus is likewise of plastic; the length of the bracket 38.1 is essentially equal to the width of the housing 36, so that the upper bracket 38.1 can spread apart resiliently toward the top, because of the given elasticity of the plastic material used. On its free end, the bracket 38.1 has a downward-protruding detent protrusion 40, which in the mounted state snaps into the slitlike indentation 22.2 on the top of the laser distance measuring device 10.

Conversely, the lower bracket 38.2 is integrally formed onto the inner edge of the housing 36 of the sighting telescope 20 and is relatively short, so that the bracket 38.2 has only relatively slight resilience. Once again, two hooks 42.1, 42.2 are integrally formed onto the free end of the bracket 38.2; in the mounted state, they are suspended in the slitlike indentation 24.2 on the underside of the laser distance measuring device 10.

For mounting the sighting telescope 20, accordingly first the hooks 42.1, 42.2 are suspended into the slitlike indentation 24.2 on the underside of the laser distance measuring device 10. Next, the user then presses on the housing 36 of the sighting telescope 20 from outside, so that the sighting telescope 20 is pivoted toward the laser distance measuring device 10, and in the process the hooks 42.1, 42.2 suspended in the indentation 24.2 on the laser distance measuring device 10 define a pivot axis. This pivoting motion initially ends when the bracket 38.1 rests with the detent protrusion 40 on the outside of the housing 12 of the laser distance measuring device 10. By pressing again on the outside, this pressure point is overcome, and the bracket 38.1 briefly spreads apart resiliently upward, until the detent protrusion 40 finally snaps into the slitlike indentation 22.2 on the top of the laser distance measuring device 10 and thereby fixes the sighting telescope 20.

For removal of the sighting telescope 20, the user grasps the free end of the upper bracket 38.1 and pulls it slightly upward, until the detent protrusion 40 is no longer held in the slitlike indentation 22.2 of the laser distance measuring device 10. Next, the user pivots the sighting telescope 20 outward away from the laser distance measuring device 10, in which process the two hooks 42.1, 42.2 once again define a pivot axis. Finally, the user moves the sighting telescope 20 downward, in order to release the hooks 42.1, 42.2 from the slitlike indentation 24.1 on the underside of the laser distance measuring device 10.

The invention is not limited to the preferred exemplary embodiments described above. On the contrary, many variants and modifications that likewise make use of the concept of the invention and are therefore within the scope of the invention are conceivable.

LIST OF REFERENCE NUMERALS

10 Laser distance measuring device
12 Housing
14 Keypad
16 Display
18 Tubular spirit level
20 Sighting telescope
22.1, 22.2 Indentation
24.1, 24.2 Indentation
26.1, 26.2 Hook
28 Connecting wall
30 Measuring body
32.1, 32.2 Detent elements
34 Lens
36 Housing
38.1, 38.2 Brackets
40 Detent protrusion
42.1, 42.2 Hook

The invention claimed is:

1. A hand-held laser distance measuring device, having a housing (12), a display (16) being disposed on a top side of said housing (12), a first mount for releasable fastening of at least one first accessory (18), wherein the first mount is disposed on said top side of said housing (12) laterally beside said display (16) and has at least one first detent element (22.1), which in the mounted state of the first accessory (18) latches to the first accessory (18), wherein said first mount has an upper slitlike indentation (22.1) on said top side of said housing (12), and wherein a lower slitlike indentation (24.1) is disposed on an underside of said housing (12).

2. The device (10) of claim 1, wherein for alternative fastening of the first accessory (18), or for additional fastening of a second accessory (20), a second mount is provided, which has at least a second detent element (22.2), which in the mounted state latches to the first accessory (18) or the second accessory (20).

3. The device (10) of claim 2, wherein the first mount and the second mount are disposed laterally side by side.

4. The device (10) of claim 2, wherein the first mount and the second mount have the same spatial orientation.

5. The device (10) of claim 1, characterized by a device housing (12), with which the first mount and/or the second mount is integrated.

6. The device (10) of claim 5, wherein the device housing (12), for snapping into the first accessory (18) or the second accessory (20) has at least two indentations (22.1, 22.2) and/or undercuts, which are disposed at a predetermined spacing from one another.

7. An accessory (18, 20) for a device (10) for a laser distance measuring device, having a fastening element for releasable fastening to the device (10), wherein the fastening element has at least one detent element (32.1, 32.2, 40), which in the mounted state latches to the device (10).

8. The accessory (18, 20) of claim 7, wherein the fastening element has at least one detent protrusion (32.1, 32.2, 40), which in the mounted state snaps into a corresponding indentation (22.1, 22.2) or undercut on the device.

9. The accessory (18, 20) of claim 7, wherein for connection to the device (10), a hook (26.1, 26.2, 42.1, 42.2) is provided.

10. The accessory (18, 20) of claim 9, wherein the hook (26.1, 26.2, 42.1, 42.2) is disposed rigidly, while the detent element (32.1, 32.2, 40) is disposed resiliently.

11. The accessory (18, 20) of claim 10, wherein the detent element (32.1, 32.2, 40) is provided on a first bracket (38.1), and the hook (42.1, 42.2) is provided on a second bracket (38.2).

12. The accessory (18, 20) of claim 11, wherein the first bracket (38.1) is longer than the second bracket (38.2).

13. The accessory of claim 7, wherein the accessory is a sighting telescope.

14. The accessory of claim 7, wherein the accessory is a spirit level.

15. The device (10) of claim 1, wherein the indentation (22.1) extends parallel to the long edge of the housing (12).

16. The device (10) of claim 1, wherein the lower slitlike indentation (24.1) disposed on the underside of the housing (12) is oriented parallel to the upper slitlike indentation (22.1) on the top of the housing.

17. The device (10) of claim 1, wherein the first mount comprises a bayonet mount.

18. The accessory (18, 20) of claim 8, wherein the at least one detent protrusion is disposed on a bracket (38.1, 38.2).

19. The accessory (18, 20) of claim 18, wherein the at least one detent protrusion (32.1, 32.2, 40) is disposed on two brackets (38.1, 38.2), wherein said brackets are elastic relative to one another.

20. The accessory (18, 20) of claim 19, wherein the brackets (38.1, 38.2) are provided for spreading resiliently apart when slipped onto a mount of the device (10).

21. The accessory (18, 20) of claim 8, characterized by a bayonet mount.

22. The device of claim 1, wherein said underside of said housing (12) is arranged opposite to said top side of said housing (12).

23. The device of claim 2, wherein said second mount is arranged on said top side of said housing (12) opposite to said first mount relative to said display (16).

24. The device of claim 2, wherein said second mount has an upper slitlike indentation (22.2) on said top side of said housing (12) and a second lower slitlike indentation (24.2) is disposed on said underside of said housing (12).

25. The device of claim 2, wherein said first mount is associated with a first side of said housing (12) and said second mount is associated with a second side of said housing (12), said first side and second side each being a lateral side of said housing (12) relative to said top side and said underside and being disposed opposite to each other.

26. The device of claim 1, wherein said housing (12) is a rectangular housing.

27. The accessory of claim 9, further comprising a connecting wall (28), wherein said connecting wall (28) connects the hook (26.1, 26.2, 42.1, 42.2) to a measuring body (30).

28. A system with the device of claim 1 and the accessory of claim 7.

29. The system of claim 28, wherein in the mounted state of said accessory (18), said accessory (18) encompasses a side of said housing (12) completely, said side being a lateral side of said housing (12) relative to said top side and said underside.

30. The system of claim 28, wherein said accessory (18) has a measuring body (30), wherein in the mounted state of said accessory (18), said measuring body (30) is disposed on said top side of said housing (12) laterally beside said display (16).

31. The system of claim 28, wherein said accessory (18) has a connecting wall (28), wherein in the mounted state of said accessory (18), said connecting wall (28) extends perpendicular to said top side of said housing (12).

32. The system of claim 31, wherein said accessory (18) has a measuring body (30), wherein in the mounted state of said accessory (18), said measuring body (30) protrudes inward from the connecting wall (28) and thereby overlaps said top side of said housing (12).

33. The system of claim 31, wherein in the mounted state of said accessory (18), said connecting wall (28) has a spacing laterally from said lateral side.

\* \* \* \* \*